(12) United States Patent
Ide et al.

(10) Patent No.: US 8,967,706 B2
(45) Date of Patent: Mar. 3, 2015

(54) ROOF APPARATUS FOR VEHICLE

(71) Applicant: Aisin Seiki Kabushiki Kaisha, Kariya-shi, Aichi-ken (JP)

(72) Inventors: Yoshitaka Ide, Anjo (JP); Tatsuya Matsui, Kariya (JP); Ryuta Fukada, Kariya (JP); Makoto Muranaka, Nagoya (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 6 days.

(21) Appl. No.: 13/894,462

(22) Filed: May 15, 2013

(65) Prior Publication Data

US 2013/0307292 A1 Nov. 21, 2013

(30) Foreign Application Priority Data

May 21, 2012 (JP) .................................. 2012-115611

(51) Int. Cl.
*B60J 7/02* (2006.01)
*B60J 7/00* (2006.01)
*B60J 7/043* (2006.01)

(52) U.S. Cl.
CPC ................ *B60J 7/0038* (2013.01); *B60J 7/043* (2013.01); *B60J 7/003* (2013.01); *B60J 7/0435* (2013.01)
USPC ..................................... 296/214; 296/216.03

(58) Field of Classification Search
CPC ......... B60J 7/003; B60J 1/2011; B60J 7/0015
USPC ........... 296/214, 216.02–216.05, 221, 220.01
See application file for complete search history.

(56) References Cited

U.S. PATENT DOCUMENTS

| | | | |
|---|---|---|---|
| 5,484,184 A | * | 1/1996 | Kohlpaintner et al. ....... 296/217 |
| 8,052,207 B2 | | 11/2011 | Horiuchi et al. |
| 2009/0072589 A1 | * | 3/2009 | Ito et al. .................. 296/216.04 |

FOREIGN PATENT DOCUMENTS

| | | | |
|---|---|---|---|
| DE | 19914118 | * | 9/2000 |
| JP | 5-85178 | * | 4/1993 |
| JP | 8-310247 | * | 11/1996 |
| JP | 2004-249851 | | 9/2004 |
| JP | 2011-5960 | | 1/2011 |

* cited by examiner

*Primary Examiner* — Dennis H Pedder
(74) *Attorney, Agent, or Firm* — Finnegan, Henderson, Farabow, Garrett & Dunner, LLP

(57) ABSTRACT

A roof apparatus for a vehicle includes a movable panel configured to open and close an opening portion, a sunshade configured to be opened in association with an opening operation of the movable panel, a guide rail, a sliding member causing the movable panel in a fully-closed state to move to a tilt state and to perform the opening operation, an engaging member mounted on a front portion of the movable panel and including an engaging portion and a mounting portion at which the engaging member is mounted on the movable panel, the engaging portion is arranged at a vehicle front side relative to the mounting portion, and an engaged member provided at the sunshade, the engaged member is pressed by the engaging portion when the movable panel performs the opening operation.

6 Claims, 7 Drawing Sheets

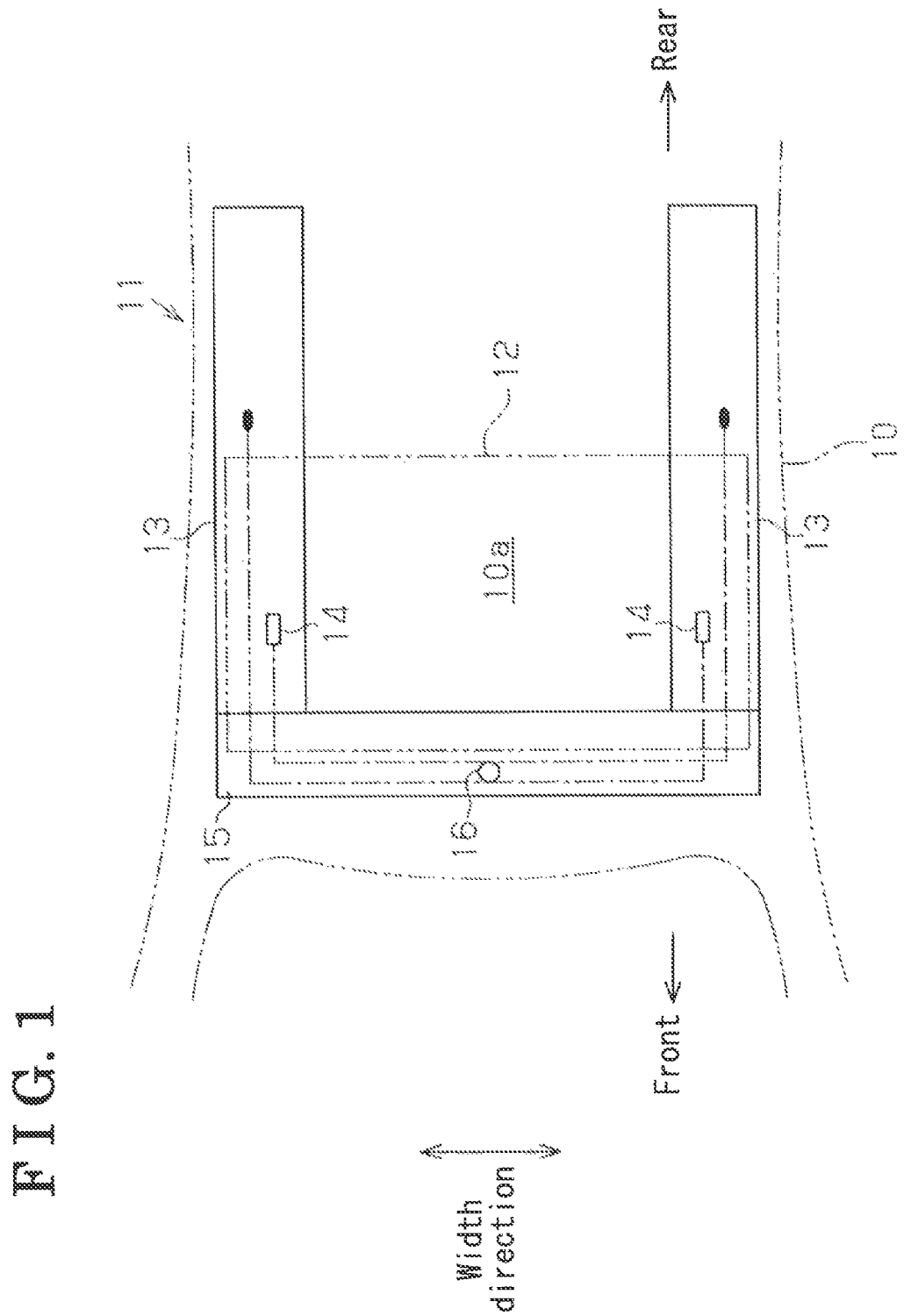

Vehicle outer side ←——————→ Vehicle inner side
Width direction

ROOF APPARATUS FOR VEHICLE

CROSS REFERENCE TO RELATED APPLICATIONS

This application is based on and claims priority under 35 U.S.C. §119 to Japanese Patent Application 2012-115611, filed on May 21, 2012, the entire content of which is incorporated herein by reference.

TECHNICAL FIELD

This disclosure generally relates to a roof apparatus for a vehicle.

BACKGROUND DISCUSSION

A known roof apparatus for a vehicle is disclosed in JP2011-5960A (hereinafter referred to as Patent reference 1). According to the known roof apparatus disclosed in Patent reference 1, a sunshade for adjusting light transmission at an opening portion formed at a roof portion of the vehicle is configured to be opened in association with an opening operation of a movable panel for opening/closing the opening portion. As illustrated in FIG. 8, the known roof apparatus disclosed in Patent reference 1 is provided with an interlocking mechanism 93 for performing opening/closing operations of a sunshade panel 92 in mechanically association with or interlocked with opening/closing operations of a movable panel 91. That is, the interlocking mechanism 93 includes a first engaging member 94 and a second engaging member 95 which are provided at the movable panel 91, and a first engaged member 96 and a second engaged member 97 which are provided at the sunshade panel 92 and engaging with the first engaging member 94 and the second engaging member 95 in a vertical direction, respectively.

For example, in a case where the movable panel 91 performs the opening operation, when the movable panel 91 in a tilt-up state moves rearward, the first engaging member 94 presses the first engaged member 96, and thus the sunshade panel 92 performs the opening operation in association with the opening operation of the movable panel 91.

According to Patent reference 1, however, the first engaging member 94 provided at the movable panel 91 hangs or protrudes downwardly substantially directly beneath a mounting portion at which the first engaging member 94 is mounted on the movable panel 91. Thus, in a case where, for example, the movable panel 91 performs a tilt-up movement from a fully closed state, a lower end of the first engaging member 94 pivots or swings so as to come closer to the first engaged member 96 in association with the tilt-up movement of the movable panel 91. As a result, the first engaged member 96 is pressed and the sunshade panel 92 may possibly move in response thereto.

A need thus exists for a roof apparatus for a vehicle, which is not susceptible to the drawback mentioned above.

SUMMARY

According to an aspect of this disclosure, a roof apparatus for a vehicle includes a movable panel configured to open and close an opening portion provided at a roof portion of a vehicle, a sunshade configured to adjust light transmission at the opening portion and configured to be opened in association with an opening operation of the movable panel, a guide rail provided at an edge portion of the opening portion in a vehicle width direction and extending in a vehicle front/rear direction, a sliding member connected to an edge portion of the movable panel in the vehicle width direction and being movable along the guide rail in the vehicle front/rear direction, the sliding member causing the movable panel in a fully-closed state to move to a tilt state and causing the movable panel to perform the opening operation, by moving in the vehicle front/rear direction, an engaging member mounted on a front portion of the movable panel in the vehicle front/rear direction, and including an engaging portion and a mounting portion at which the engaging member is mounted on the movable panel, the engaging portion being arranged at a vehicle front side relative to the mounting portion and extending downwardly, and an engaged member provided at the sunshade to be arranged at a vehicle rear side relative to the engaging portion of the engaging member and extending upwardly from the sunshade, the engaged member being pressed by the engaging portion when the movable panel performs the opening operation.

BRIEF DESCRIPTION OF THE DRAWINGS

The foregoing and additional features and characteristics of this disclosure will become more apparent from the following detailed description considered with the reference to the accompanying drawings, wherein:

FIG. 1 is a plan view schematically illustrating a first embodiment disclosed here;

DETAILED DESCRIPTION

Figure 2A:
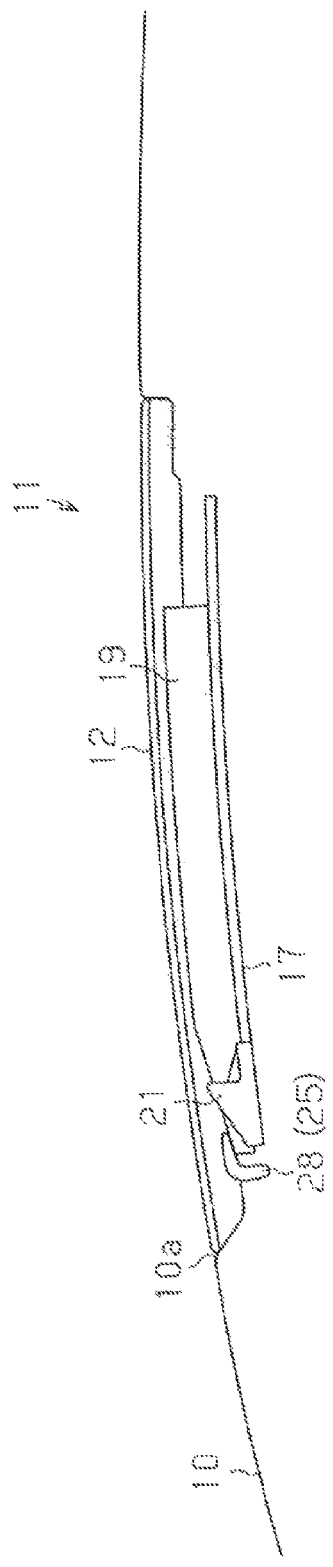
FIG. 2A is a cross-sectional view illustrating a fully-closed state of the first embodiment.

A first embodiment disclosed here will be explained with reference to FIGS. 1 to 7. Hereunder, a vehicle front/rear direction is referred to as "front/rear direction", and upward and downward in a vehicle height direction are referred to as "upward" and "downward", respectively. An inner side in a vehicle width direction, which faces toward an inward of a vehicle cabin, is referred to as "vehicle inner side" and an outer side in the vehicle width direction, which faces toward an outward of the vehicle cabin, is referred to as "vehicle outer side".

As illustrated in FIG. 1, a roof apparatus 11 for a vehicle (roof apparatus 11) is mounted on a roof 10 (i.e., a roof portion) of a vehicle including, for example, an automobile. Specifically, the roof 10 is provided with a roof opening portion 10*a* (i.e., an opening portion) formed in a substantially rectangular shape and a movable panel 12 which is made of, for example, glass plate. The roof apparatus 11 is provided with a guide rail 13 fixedly arranged at each of edge portions of the roof opening portion 10*a* in the vehicle width direction, that is, the guide rails 13 are provided as a pair. Each of the guide rails 13 is made of, for example, aluminum alloy extruded material, and includes a constant cross section in a lengthwise direction thereof and extends in the front/rear direction.

Each of the guide rails 13 supports and guides a sliding member 14 so that the sliding members 14 are movable in the front/rear direction. Edge portions of the movable panel 12 in the vehicle width direction are supported at the respective sliding members 14 in a manner that the movable panel 12 bridges between the sliding members 14. The sliding members 14 cause the movable panel 12 to move so as to open/close the roof opening portion 10*a* as the sliding members 14 move along the respective guide rails 13.

The roof apparatus 11 is provided with a front housing 15 connected to a front end portion of each of the guide rails 13 in the vehicle front/rear direction and extending in the vehicle width direction. The front housing 15 is made of, for example, a resin material. A driving member 16 (for example, an electric motor) is provided at an intermediate portion of the front housing 15 in a lengthwise direction thereof. The driving member 16 is connected to each of the sliding members 14 and the sliding members 14 are driven by the driving member 16 to move in the front/rear direction at the same time with each other. As the sliding members 14 move in the front/rear direction, the movable panel 12 performs opening/closing operations as described above.

Figure 2B:
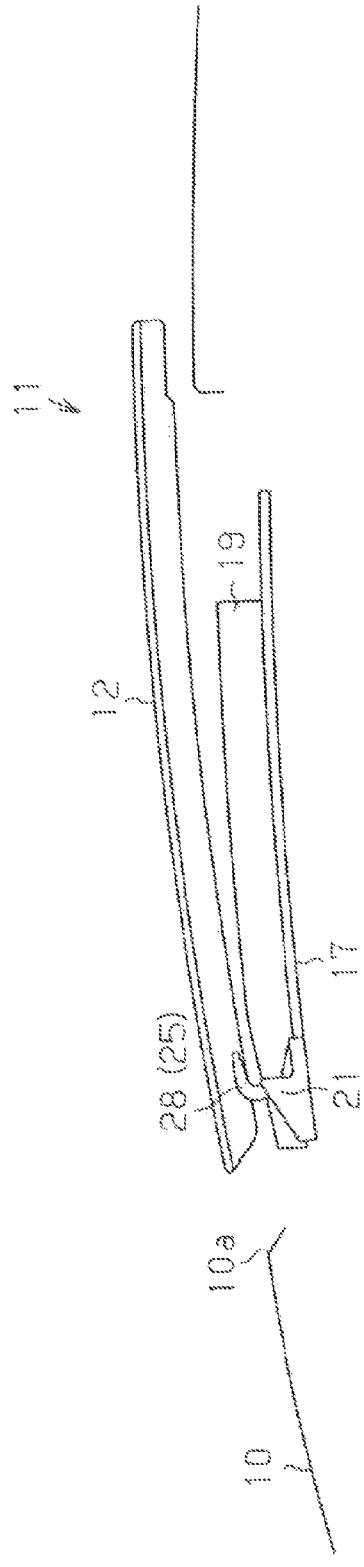
FIG. 2B is a cross-sectional view illustrating a pop-up state of the first embodiment.

The movable panel 12 is attached so as to be able to perform a tilt-up movement, a pop-up movement and a sliding movement. In the tilt-up movement, a rear portion of the movable panel 12 moves upwardly relative to a front portion of the movable panel 12, that is, the rear portion of the movable panel 12 pivots upwardly about the front portion of the movable panel 12. In the pop-up movement, the rear portion and the front portion of the movable panel 12 move upwardly together with each other. In the sliding movement, the movable panel 12 moves to slide in the front/rear direction. As illustrated in FIGS. 2A and 2B, a so-called outer-sliding type is employed in the opening and closing operations of the movable panel 12 to open and close the roof opening portion 10*a*, where the movable panel 12 moves to slide while being maintained in a pop-up state.

Further, the roof 10 is provided with a garnish 19 arranged in a standing condition below each of the edge portions of the movable panel 12 in the vehicle width direction. Each of the garnishes 19 is formed in a substantially elongated shape and extends in the front/rear direction. The garnishes 19 are for covering, for example, the respective sliding members 14 from an inside of a vehicle cabin, and a front end portion of each of the garnishes 19 is formed to be inclined, that is, be narrower in a vehicle up/down direction, toward the vehicle front direction so that the garnish 19 is restricted from interfering with, for example, the movable panel 12.

Figure 3:
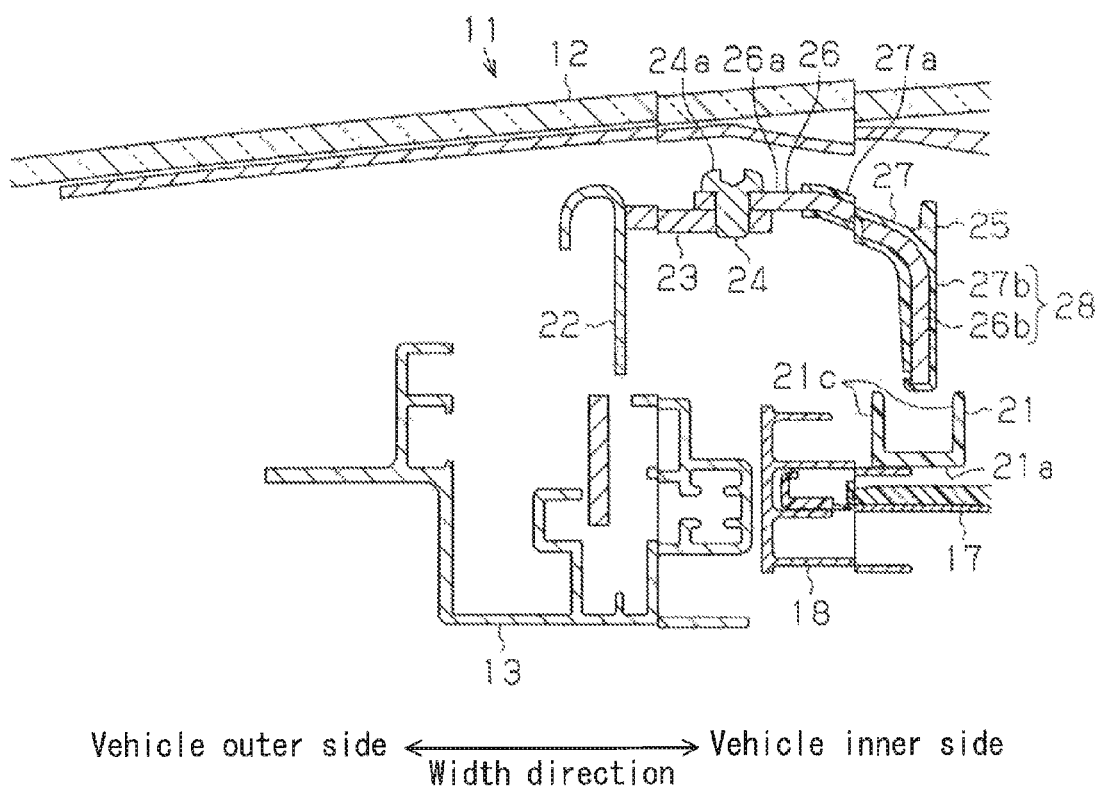
FIG. 3 is a cross-sectional view illustrating the first embodiment.

Further, a sunshade panel 17 (i.e., sunshade) made of, for example, a resin plate and formed in a substantially rectangular shape is provided at the roof 10 so as to be positioned below the movable panel 12. The sunshade panel 17 is provided to be movable in the front/rear direction for adjusting light transmission at the roof opening portion 10*a*. Specifically, as illustrated in FIG. 3, the roof apparatus 11 is provided with a guide rail 18 for the sunshade, which is fixedly arranged at each of the edge portions of the roof opening portion 10*a* in the vehicle width direction, that is, the guide rails 18 are provided as a pair. Each of the guide rails 18 for the sunshade is fixedly arranged next to the corresponding guide rail 13 to be positioned at the vehicle inner side relative to the guide rail 13. Each of the guide rails 18 for the sunshade includes a substantially E-shaped cross section opening toward the vehicle inner side, the E-shaped cross section which is constant in the front/rear direction, and extends in the front/rear direction (that is, the direction that is orthogonal to a paper surface of FIG. 3). Edge portions of the sunshade panel 17 in the vehicle width direction are attached to the respective guide rails 18 for the sunshade so that the sunshade panel 17 slides on the guide rails 18 for the sunshade to move in the front/rear direction. As the sunshade panel 17 moves in the front/rear direction, the sunshade panel 17 opens and closes the roof opening portion 10*a*, thereby adjusting the light transmission at the roof opening portion 10*a*. As illustrated in FIG. 2A, in a fully-closed state of the sunshade panel 17, a position of a front end of the sunshade panel 17 and a position of a front end of each of the garnishes 19 coincide with each other in the front/rear direction.

Figure 4:
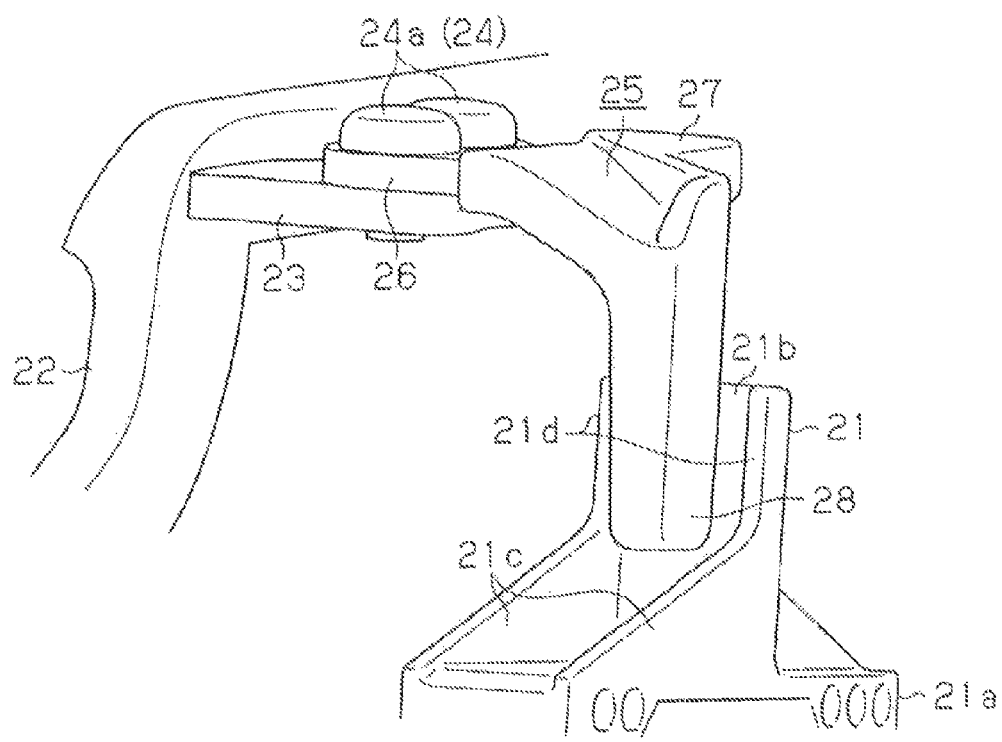
FIG. 4 is a perspective view illustrating the first embodiment.

Engaged members 21 are provided at an upper surface of a front end portion of the sunshade panel 17 to be adjacent to the respective garnishes 19 (the guide rail 18 for the sunshade), at the vehicle inner side relative to the garnish 19. As illustrated in FIG. 4, each of the engaged members 21 includes a bottom wall portion 21*a* fixedly mounted on the upper surface of the front end portion of the sunshade panel 17 and formed in a substantially rectangular shape, and a vertical wall portion 21*b* provided to extend upwardly from an intermediate portion of the bottom wall portion 21*a* in the front/rear direction and formed in a substantially rectangular shape. Further, each of the engaged members 21 includes a pair of flanges 21*c* each formed in a substantially triangular shape. One side of the substantially triangular shape corresponds to an edge portion, in the vehicle width direction, of a part of the bottom wall portion 21*a*, the part which is positioned in the vehicle front side relative to the vertical wall portion 21*b*. Another side of the substantially triangular shape corresponds to an edge portion, in the vehicle width direction, of a lower end portion of the vertical wall portion 21*b*. Further, each of the engaged members 21 includes a pair of restricting pieces 21*d* each formed in a rib-like shape and provided at an edge portion, in the vehicle width direction, of an upper portion of the vertical wall portion 21*b* in a manner that each of the restricting pieces 21*d* protrudes in the vehicle front direction. The pair of restricting pieces 21*d* is connected to the pair of flanges 21*c* at respective lower ends of the restricting pieces 21*d*. That is, the engaged member 21 is formed in a groove configuration having a substantially U-shape, which provides a communication in the vehicle height direction (that is, the groove configuration extends in the vehicle height direction) at the front side relative to the vertical wall portion 21*b*. Depth of the substantially U-shape of the engaged member 21 in the front/rear direction increases at the flanges 21*c* toward the downward direction.

On the other hand, as illustrated in FIG. 3, a supporting bracket 22 which is made of, for example, a metal plate is fixed at a bottom surface of the movable panel 12 above each of the guide rails 13. Thus, each of the supporting brackets 22 is positioned basically at the vehicle outer side relative to the corresponding guide rail 18 for the sunshade (and the corresponding engaged member 21). The sliding members 14 are connected to the respective edge portions of the movable panel 12 in the vehicle width direction via the respective supporting brackets 22.

A mounting bracket 23, which is formed in a substantially flat-plate shape and extends substantially horizontally toward the vehicle inner side, is fixedly attached to a front end portion of each of the supporting brackets 22. An engaging member 25 is placed, that is, overlaid on an upper surface of each of the mounting brackets 23 and is fastened to the mounting bracket 23 by means of a screw 24 (i.e., a fastener). The engaging member 25 includes a plate 26 made of metal and serving as a core of the engaging member 25, and a molded portion 27 made of resin. The molded portion 27 is formed integrally with the plate 26.

Figure 5:
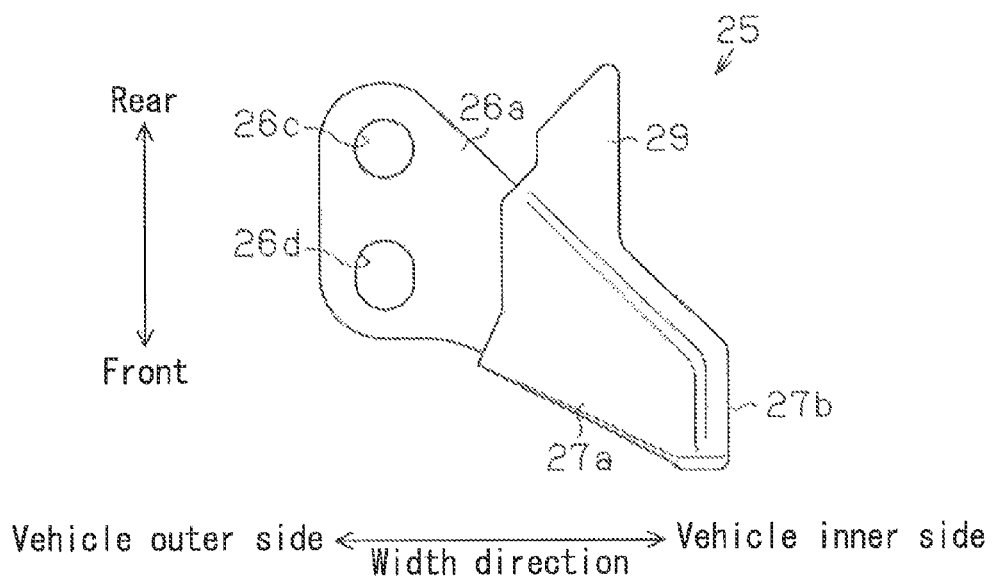
FIG. 5 is a plan view illustrating an engaging member of the first embodiment.

Each of the plates 26 includes a mounting area 26a which is placed, that is, overlaid on the upper surface of the corresponding mounting bracket 23 and extends toward the vehicle inner side. Further, each of the plates 26 includes a downwardly-extending portion 26b extending downwardly from a vehicle-inner-side end portion of the mounting area 26a. As illustrated in FIG. 5, the mounting area 26a is formed to be oblique in the vehicle front direction toward the vehicle inner side in a manner that a width of the mounting area 26a is gradually decreased toward an end portion thereof. A base end portion of the mounting area 26a is provided with an insertion hole 26c formed in a substantially circular shape, and an insertion hole 26d (i.e., a mounting portion and a mounting hole) which is positioned at the vehicle front side relative to the insertion hole 26c and is formed in a substantially elongated circular shape extending in the front/rear direction. Each of the insertion holes 26c and 26d receives the screw 24 inserted therethrough. That is, the screws 24 are provided as a pair so as to be arranged adjacent to each other in the front/rear direction. The insertion hole 26d is formed in the elongated circular shape in the front/rear direction in order to assure an allowance for adjustment of a mounting position in the front/rear direction when the engaging member 25 is mounted on the mounting bracket 23 (the movable panel 12). That is, mounting or attachment of the engaging member 25 relative to the movable panel 12 is adjustable in the vehicle front/rear direction.

As illustrated in FIG. 3, the molded portion 27 includes a body portion 27a and a downwardly-extending portion 27b. In the body portion 27a, the vehicle-inner-side end portion of the mounting area 26a of the plate 26 is buried. The downwardly-extending portion 27b, which is formed in a substantially rectangular parallelepiped shape, is connected to a vehicle-inner-side end portion of the body portion 27a and the downwardly-extending portion 26b is buried in the downwardly-extending portion 27b. The downwardly-extending portions 26b and 27b form or define an engaging portion 28 in cooperation with each other. The engaging portion 28 is positioned at the vehicle front side relative to the insertion hole 26d (that is, the mounting portion at which the engaging member 25 is mounted on the movable panel 12). Further, the engaging portion 28 is set such that a width thereof is smaller than a width of the engaged member 21 in the vehicle width direction. The engaging portion 28 fits in a range of the width of the engaged member 21 (between the restricting pieces 21d) in the vehicle width direction and is arranged in the vehicle front side relative to the engaged member 21. That is, the engaging portion 28 is arranged in a manner that a movement locus thereof in the vehicle rear direction is blocked by the engaged member 21 (the vertical wall portion 21b).

Figure 6A:
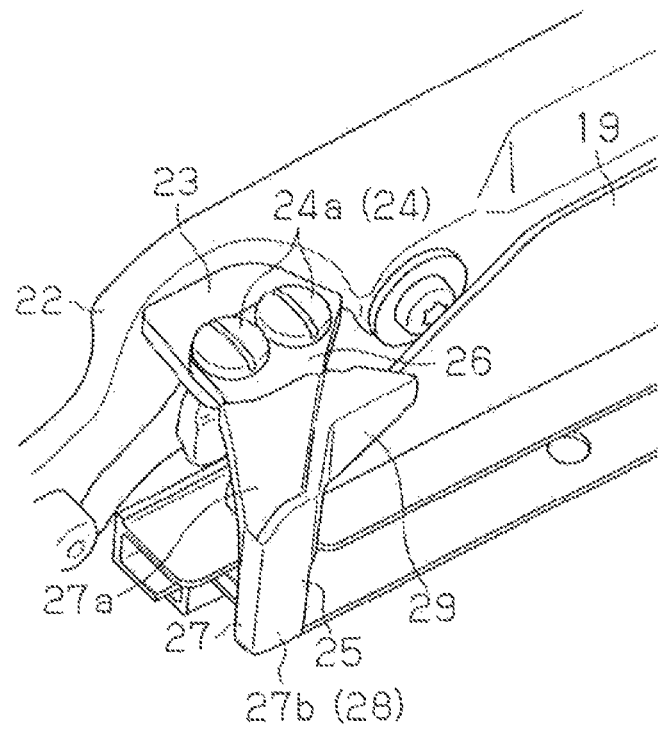
FIG. 6A is a perspective view illustrating the first embodiment.
Figure 6B:
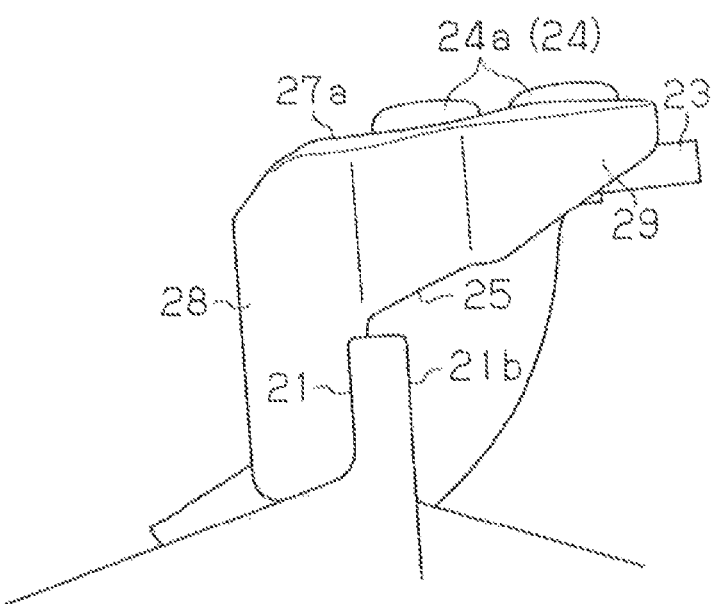
FIG. 6B is a perspective view illustrating the first embodiment.

As illustrated in FIGS. 6A and 6B, the molded portion 27 includes a shielding portion 29 formed in a substantially pointed or sharp shape, which is connected to a vehicle-outer-side end of the body portion 27a and protrudes in the vehicle rear direction. The shielding portion 29 is for covering a screw head portion 24a of each of the screws 24 from the inside of the vehicle cabin.

Figure 7A:
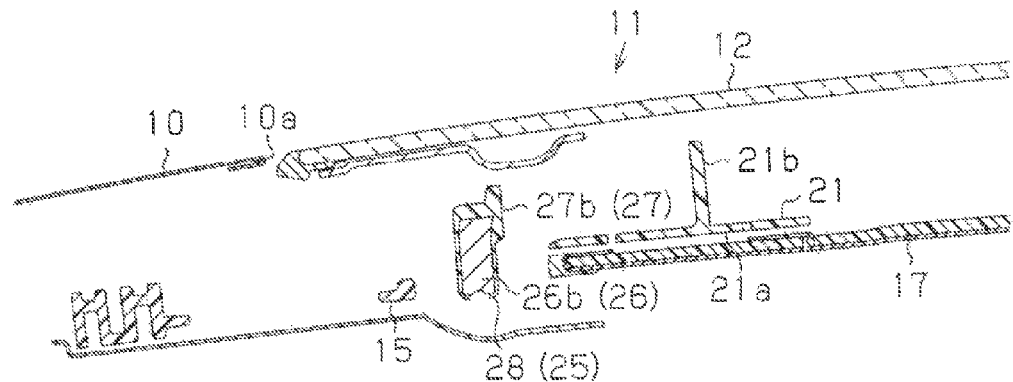
FIG. 7A is a cross-sectional view illustrating a positional relationship between an engaged member and the engaging member in the fully-closed state according to the first embodiment.
Figure 7B:
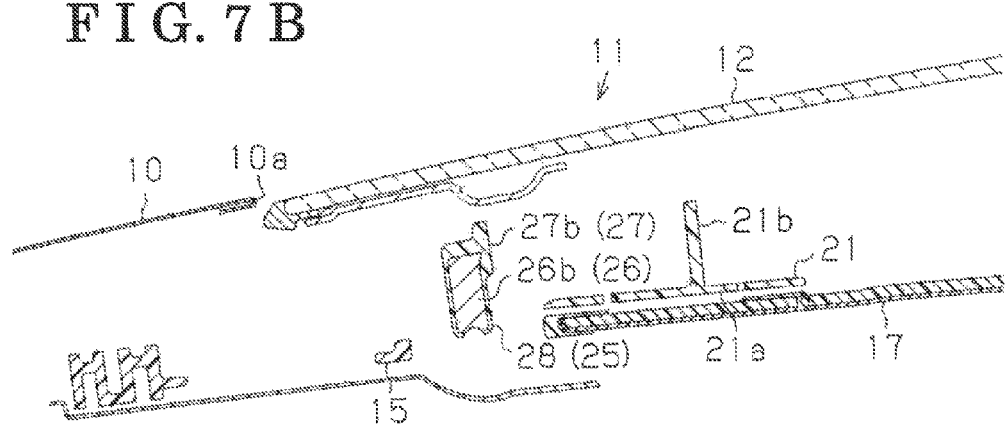
FIG. 7B is a cross-sectional view illustrating the positional relationship between the engaged member and the engaging member in the tilt-up state according to the first embodiment.
Figure 7C:
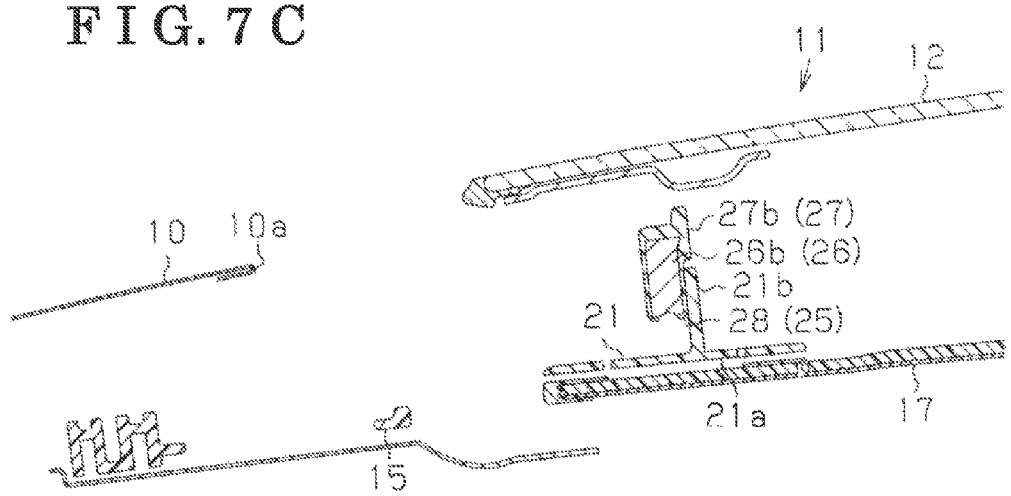
FIG. 7C is a cross-sectional view illustrating the positional relationship between the engaged member and the engaging member in the pop-up state according to the first embodiment.
Figure 8:
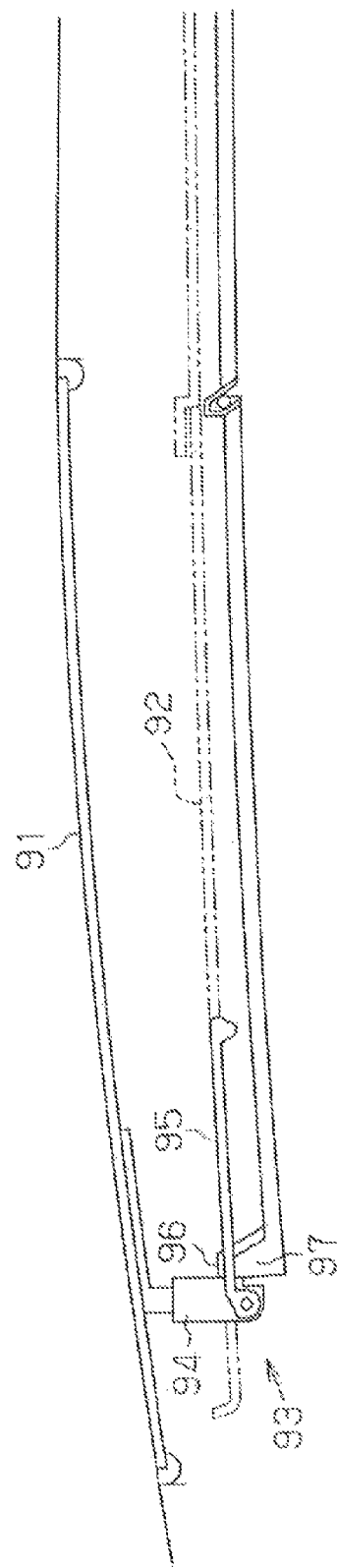
FIG. 8 is a cross-sectional view illustrating part of a known roof apparatus.

The engaging member 25 spans over, that is, extends above, the corresponding garnish 19 in the vehicle width direction via the mounting bracket 23, and thus the engaging portion 28 is provided at the vehicle inner side relative to the garnish 19 so as to extend downwardly. Accordingly, the engaging member 25 is restricted from interfering with the corresponding garnish 19. As illustrated in FIGS. 7A and 7B, in the fully-closed state and a tilt-up state of the movable panel 12, the engaging portion 28 is spaced away from the engaged member 21 (the bottom wall portion 21a) in the vehicle front direction, that is, the engaging portion 28 of the engaging member 25 and the engaged member 21 are out of contact with each other, and therefore the interference between the engaging portion 28 and the engaged member 21 is restricted at least in a case where the engaging portion 28 pivots or swings when the movable panel 12 transitions between the fully-closed state and the tilt-up state. On the other hand, as illustrated in FIGS. 7C and 4, when the movable panel 12 performs the sliding movement in the vehicle rear direction while being maintained in the pop-up state, the engaging portion 28 presses the engaged member 21 (the vertical wall portion 21b) in the vehicle rear direction. Thus, when the movable panel 12 performs an opening operation, the engaging portion 28 (the engaging member 25) and the engaged member 21 engage with each other, and as a result, the sunshade panel 17 operates the opening operation integrally with the movable panel 12.

Next, an operation of this embodiment will be explained. In the fully-closed state of the movable panel 12 as illustrated in FIG. 7A, when the sliding members 14 are driven by the driving member 16 and move in the vehicle rear direction, the state of the movable panel 12 connected to the sliding members 14 transitions to the tilt-up state as illustrated in FIG. 7B. At this time, as the movable panel 12 pivots, a lower end of the engaging portion 28 comes closer to the engaged member 21, however, the engaging portion 28 is restricted from interfering with the engaged member 21 because the engaging portion 28 is spaced away from the engaged member 21 in the vehicle front direction. Specifically, the interference between the engaging portion 28 and the engaged member 21 is more reliably restricted because the engaging portion 28 is positioned at the vehicle front side relative to the insertion hole 26d (that is, the mounting portion mounted on the movable panel 12). In addition, a reaction of the sunshade panel 17 when the movable panel 12 performs the tilt-up movement from the fully-closed state, that is, the movement of the sunshade panel 17 in response to the tilt-up movement of the movable panel 12, is restricted more reliably.

Next, when the sliding members 14 driven by the driving member 16 further move in the vehicle rear direction, the movable panel 12 connected to the sliding members 14 moves to be in the pop-up state as illustrated in FIG. 7G. At this time, the movable panel 12 starts to move in the vehicle rear direction and the engaging portion 28 comes in contact with or comes closer to the engaged member 21. Thus, as the sliding members 14 driven by the driving member 16 move further in the vehicle rear direction, the sunshade panel 17 performs the opening operation integrally with the movable panel 12 by means of the engagement between the engaging portion 28 (the engaging member 25) and the engaged member 21.

As described above, according to this embodiment, the following effects and advantages are obtained. (1) According to this embodiment, for example, in a case where the movable panel 12 in the fully-closed state performs the tilt-up movement, even though the engaging portion 28 pivots or swings to come closer to the engaged member 21, the engaging portion 28 is not likely to interfere with the engaged member 21 because the engaging portion 28 is positioned at the vehicle front side relative to the insertion holes 26c and 26d. That is, the more the engaging portion 28 is positioned at the vehicle front side relative to the insertion holes 26c and 26d, the less the engaging portion 28 is likely to interfere with the engaged member 21. Accordingly, when the movable panel 12 performs the tilt-up movement from the fully-closed state, the reaction of the sunshade panel 17 is more reliably restricted. When the movable panel 12 which is in the pop-up state performs the opening operation, the engaged member 21 is pressed by the engaging portion 28, and thus the sunshade panel 17 is caused to perform the opening operation in association with the opening operation of the movable panel 12.

(2) According to this embodiment, the engaging member 25 is fastened to the mounting bracket 23 (a front portion of the movable panel 12 in the vehicle front/rear direction) by means of the screw 24 inserted through the insertion hole 26d formed in the elongated circular shape and including the allowance for the adjustment in the front/rear direction. Thus, for example, even in a case where the engaging portion 28 is close to or approaches the front housing 15 because of, for example, a manufacturing variation and/or an assembling variation of the engaging member 25 and the like, the engaging portion 28 is restricted from interfering the front housing 15 by adjusting a position of the engaging portion 28 within a range of the allowance for the adjustment in the front/rear direction which is provided by the insertion hole 26d.

(3) According to this embodiment, the screw 24 (the screw head portion 24a) is covered with the shielding portion 29 of the engaging member 25 from the inside of the vehicle cabin. Thus, a deterioration of appearance caused by exposure of the screw 24 is restricted.

(4) According to this embodiment, the width of the engaged member 21 (the vertical wall portion 21b) is widened or increased compared to the width of the engaging portion 28 in the vehicle width direction. Thus, even in a case where a position of the engaging portion 28 is dislocated relative to the engaged member 21 in the vehicle width direction because of, for example, the manufacturing variation and/or the assembling variation of the sliding member 14, the engaging member 25 and the like, the engagement between the engaging portion 28 and the engaged member 21 is reliably achieved in a range of the width of the engaged member 21 which is increased compared to the width of the engaging portion 28.

(5) According to this embodiment, the sliding members 14 are covered with the garnishes 19 from the inside of the vehicle cabin, and thus a deterioration of appearance caused by the exposure of the sliding members 14 is restricted. In addition, the engaging member 25 spans or straddles over the corresponding garnish 19 in the vehicle width direction and the engaging portion 28 of the engaging member 25 extends downwardly. Thus, it is restricted that the engagement of the engaging portion 28 (the engaging member 25) and the engaged member 21 with each other is blocked by the garnish 19.

(6) According to this embodiment, the engaging member 25 (and the mounting bracket 23) is provided separately from the supporting bracket 22. Therefore, by changing only the engaging member 25, this embodiment may be applied to car models where, for example, a positional relationship between the engaging member 25, and the front housing 15 and/or the sunshade panel 17 (that is, an arrangement or a layout of the engaging member 25 relative to the front housing 15 and/or the sunshade panel 17) is different. Specifically, because the engaging member 25 includes, at the insertion hole 26d formed in the elongated circular shape, the allowance for the adjustment in the front/rear direction, this embodiment may possibly be applied to the above-stated different car models without changing the engaging member 25.

(7) According to this embodiment, the engaging members 25 are fixedly attached to the movable panel 12 (the supporting bracket 22), and therefore an amount of movement of the engaging members 25 in the front/rear direction when the movable panel 12 performs the tilt-up movement from the fully-closed state is reduced compared to an amount of movement of the engaging members 25 in the front/rear direction in a case where the engaging members 25 are fixed, for example, to the respective sliding members 14. Accordingly, a distance or a clearance between the engaging member 25 and the engaged member 21 in the front/rear direction, which is needed to restrict the engaging member 25 from engaging with or interfering with the engaged member 21 when the movable panel 12 performs the tilt-up movement from the fully-closed state, may be reduced. Consequently, a size of each of the guide rails 13 and/or each of the sliding members 14 may be reduced in the front/rear direction.

In other words, if the engaging member is attached to the sliding member, the engaging member moves in the front/rear direction by an amount corresponding to an amount of movement of the sliding member when the movable panel 12 performs the tilt-up movement from the fully-closed state. Thus, a sufficient distance or clearance in front of the engaged member 21 needs to be assured so that the engaging member 25 does not interfere with the engaged member 21 in a case where the engaging member 25 moves by the above-described amount of movement of the sliding member. Accordingly, a size of each of the sliding members (and the guide rails) to which the respective engaging members are fixedly mounted needs to be increased in the front/rear direction. Consequently, a large layout space is needed for, for example, arranging the sliding members.

In contrast, the engaging member 25 that is fixed at the movable panel 12 moves by an amount of displacement in the front/rear direction, the amount of displacement which corresponds to an amount of the pivoting movement of the movable panel 12 when the movable panel 12 performs the tilt-up movement from the fully-closed state. Thus, the distance or the clearance which needs to be assured in front of the engaged member 21 is reduced. Accordingly, there is no need to increase the size of the movable panel 12 (the supporting bracket 22), which the engaging member 25 is fixed to, in the front/rear direction.

In addition, the amount of movement of the sliding member when the movable panel 12 performs the tilt-up movement from the fully-closed state generally varies depending on a vehicle type, however, this embodiment may be applied to various vehicle types more easily because the amount of movement of the engaging member 25 is reduced relative to the above-described amount of movement of the sliding member, and therefore influences by the variation in the amount of movement of the engaging member are alleviated or decreased. Specifically, this embodiment is highly likely to be applied to the various vehicles without changing or modifying the engaging member 25, which improves versatility.

(8) According to this embodiment, the engaging member 25 spans over the corresponding garnish 19 in the vehicle width direction via the corresponding mounting bracket 23, and the engaging portion 28 of the engaging member 25 is arranged to protrude downwardly toward the sunshade panel 17. Thus, in the pop-up state of the movable panel 12, the engaged member 21 and the engaging member 25 are arranged so that a sufficient allowance for the engagement, that is, a sufficient amount of the engagement, therebetween in the vehicle height direction is assured. In addition, unlike a case where the engaging member is fixed to the sliding member 14, the engaging member 25 does not need extend upwardly once and then to extend downwardly in a manner that the engaging member 25 is bent back downwardly in order to pass over the garnish 19. Accordingly, the shape or configuration of the engaging member 25 is more simplified, and thus the costs are reduced.

As described above, the sufficient allowance for the engagement between the engaged member 21 and the engaging member 25 in the vehicle height direction is assured with the simple configuration. Accordingly, even in a case where the above-described allowance for the engagement in the vehicle height direction changes in accordance with an opened/closed position of the movable panel 12 because, for example, a radius of curvature of the guide rail 13 is different from a radius of curvature of the guide rail 18 for the sunshade, the engaged member 21 and the engaging member 25 are engaged with each other more reliability. In addition, this embodiment is likely to be applied even to vehicle types where a distance in the vehicle height direction between the movable panel 12 and the sunshade panel 17 is different from one another, without changing or modifying the engaging member 25 or other components.

(9) According to the configuration of this embodiment, the engaging member 25 may be fastened to the supporting bracket 22 (the mounting bracket 23) from above the garnish 19, thereby improving an assembling performance of the engaging member 25. The garnish 19 may be provided and arranged without being subject to restrictions by, for example, the engaging member 25, and therefore the mounting structure of the garnish 19 may be simplified. Thus, the costs of the garnish 19 and the costs of the peripheral components thereof may be reduced.

The aforementioned embodiment may be modified as follows. In the aforementioned embodiment, the engaged member 21 may be made of a metal material, a resin material or a combination of the metal material and the resin material. On the other hand, the engaging member 25 may be made only of the metal material or only of the resin material.

In the aforementioned embodiment, the mounting bracket 23 may be provided integrally with the supporting bracket 22 or integrally with the engaging member 25 (the plate 26). In the aforementioned embodiment, the engaging member 25 may be fastened to the mounting bracket 23 (the movable panel 12 or the members connected to the movable panel 12) by means of, for example, a staking pin serving as the fastener. Alternatively, the engaging member 25 may be fastened to the mounting bracket 23 (the movable panel 12 or the members connected to the movable panel 12) by means of, for example, welding.

In the aforementioned embodiment, the garnishes 19 covering, for example, the respective sliding members 14 from the inside of the vehicle cabin may be omitted. In the aforementioned embodiment, the width of the engaged member 21 (the vertical wall portion 21b) in the vehicle width direction may be set to be equal to the width of the engaging portion 28 of the engaging member 25 in the vehicle width direction.

In the aforementioned embodiment, the shielding portion 29 of the engaging member 25 may be omitted in a case where, for example, the screw 24 (the screw head portion 24) is arranged so as not be exposed to the inside of the vehicle cabin or the engaging member 25 is fastened by means of, for example, welding.

In the aforementioned embodiment, the insertion hole 26d may be formed in a substantially circular shape, and therefore no allowance for adjustment in the front/rear direction is included. In the aforementioned embodiment, the engaging portion 28 of the engaging member 25 may be arranged at the vehicle outer side in the vehicle width direction relative to the guide rail 13.

In the aforementioned embodiment, the engaged member 21 and the engaging member 25 may be arranged at a central portion between the both guide rails 13. In the aforementioned embodiment, the outer-sliding type may be applied in the opening and closing operations of the movable panel 12 for opening and closing the roof opening portion 10a, where the movable panel 12 performs the sliding movement while being maintained in the tilt-up state, or a so-called inner-sliding type may be applied, where the movable panel 12 performs the sliding movement while being maintained in the tilt-down state.

This disclosure may be applied to the roof apparatus for the vehicle where the movable panel is moved to be in a tilt state when the sliding member moves in the forward direction. This disclosure may be applied to the roof apparatus for the vehicle, where plural movable panels are arranged side by side in the front/rear direction.

This disclosure may be applied to the roof apparatus for the vehicle, where plural sunshade panels are arranged side by side in the front/rear direction. In this case, all of the plural sunshade panels may move in association with the opening operation of the movable panel 12. Alternatively, any one of the plural sunshade panels may move in association with the opening operation of the movable panel 12, and the other sunshade panels may move in association with the movement of the one of the plural sunshade panels.

This disclosure may be applied to a roll shade of a so-called winding-up type. This disclosure may be applied to the roof apparatus for the vehicle, where the sunshade panel is configured to be operated to close in association with the closing operation of the movable panel.

The roof apparatus 11 for the vehicle includes the movable panel 12 configured to open and close the roof opening portion 10a provided at the roof 10 of the vehicle, the sunshade panel 17 configured to adjust the light transmission at the roof opening portion 10a and configured to be opened in association with the opening operation of the movable panel 12, the guide rail 13 provided at the edge portion of the roof opening portion 10a in the vehicle width direction and extending in the vehicle front/rear direction, the sliding member 14 connected to the edge portion of the movable panel 12 in the vehicle width direction and being movable along the guide rail 13 in the vehicle front/rear direction, the sliding member 14 causes the movable panel 12 in the fully-closed state to move to the tilt state and causes the movable panel 12 to perform the opening operation, by moving in the vehicle front/rear direction, the engaging member 25 mounted on the front portion of the movable panel 12 in the vehicle front/rear direction, and including the engaging portion 28 and the insertion hole 26d at which the engaging member 25 is mounted on the movable panel 12, the engaging portion 28 is arranged at the vehicle front side relative to insertion hole 26d (i.e., the mounting portion) and extending downwardly, and the engaged member 21 provided at the sunshade panel 17 to be arranged at the vehicle rear side relative to the engaging portion 28 of the engaging member 25 and extending upwardly from the sunshade panel 17, the engaged member 21 is pressed by the engaging portion 28 when the movable panel 12 performs the opening operation.

According to the aforementioned embodiment, in a case where the movable panel 12 performs the tilt movement from the fully-closed state, even though the engaging portion 28 pivots or swings to come closer to the engaged member 21, the engaging portion 28 is not likely to interfere with the engaged member 21 because the engaging portion 28 is positioned at the vehicle front side relative to the insertion hole 26*d*. Accordingly, when the movable panel 12 performs the tilt movement from the fully-closed state, the sunshade panel 17 is reliably restricted from moving in response to the tilt movement of the movable panel 12. When the movable panel 12 performs the opening operation, the engaged member 21 is pressed by the engaging portion 28, and thus the sunshade panel 17 is caused to perform the opening operation.

According to the aforementioned embodiment, the roof apparatus 11 for the vehicle is configured to perform the opening operation of the sunshade panel 17 in association with the opening operation of the movable panel 12, wherein the sunshade panel 17 is reliably restricted from moving in response to the tilt movement of the movable panel 12 when the movable panel 12 performs the tilt movement from the fully-closed state.

According to the aforementioned embodiment, the roof apparatus 11 further includes the front housing 15 connected to the front end portion of the guide rail 13 in the vehicle front/rear direction and extending in the vehicle width direction, wherein the engaging portion 28 of the engaging member 25 is arranged at the inner side in the vehicle width direction relative to the guide rail 13, and the engaging member 25 is configured in a manner that the mounting of the engaging member 25 relative to the movable panel 12 is adjustable in the vehicle front/rear direction.

According to the above-described configuration, even in a case where the engaging portion 28 is close to the front housing 15 because of the manufacturing variation and/or the assembling variation of, for example, the engaging member 25, the engaging portion 28 of the engaging member 25 is restricted from interfering with the front housing 15 by adjusting the position of the engaging portion 28 in the front/rear direction.

According to the aforementioned embodiment, the roof apparatus 11 further includes the front housing 15 connected to the front end portion of the guide rail 13 in the vehicle front/rear direction and extending in the vehicle width direction, wherein the engaging portion 28 of the engaging member 25 is arranged at the inner side in the vehicle width direction relative to the guide rail 13, the insertion hole 26*d* (i.e., the mounting portion) of the engaging member 25 includes the insertion hole 26*d* (i.e., the mounting hole) formed in an elongated circular shape and including the allowance for adjustment in the vehicle front/rear direction, and the engaging member 25 is fastened to the front portion of the movable panel 12 in the vehicle front/rear direction by means of the screw 24 inserted through the insertion hole 26*d*.

According to the above-described configuration, even in a case where the engaging portion 28 of the engaging member 25 is close to the front housing 15 because of the manufacturing variation and/or the assembling variation of, for example, the engaging member 25, the engaging portion 28 is restricted from interfering with the front housing 15 by adjusting the position of the engaging portion 28 within the range of the allowance for the adjustment of the insertion hole 26*d* in the front/rear direction.

According to the aforementioned embodiment, the engaging member 25 includes the shielding portion 29 covering the screw 24 from the inside of the vehicle cabin.

According to the above-described configuration, the screw 24 is covered with the shielding portion 29 of the engaging member 25 from the inside of the vehicle cabin. Thus, the deterioration of the appearance caused by the exposure of the screw 24 is restricted.

According to the aforementioned embodiment, the width of the engaged member 21 is wider than the width of the engaging portion 28 of the engaging member 25 in the vehicle width direction.

According to the above-described configuration, even in a case where the position of the engaging portion 28 is dislocated relative to the engaged member 21 in the vehicle width direction because of the manufacturing variation and/or the assembling variation of, for example, the sliding member 14 and/or the engaging member 25, the engagement between the engaging portion 28 and the engaged member 21 is more reliably achieved in the range of the width of the engaged member 21 which is increased compared to the width of the engaging portion 28.

According to the aforementioned embodiment, the roof apparatus 11 further includes the garnish 19 covering the sliding member 14 from the inside of the vehicle cabin, wherein the engaging member 25 spans over the garnish 19 in the vehicle width direction and the engaging portion 28 of the engaging member 25 extends downwardly.

According to the above-described configuration, the sliding member 14 is covered with the garnish 19 from the inside of the vehicle cabin, and thus the deterioration of the appearance caused by the exposure of the sliding member 14 is restricted. In addition, the engaging member 25 spans or straddles over the corresponding garnish 19 in the vehicle width direction and the engaging portion 28 of the engaging member 25 extends downwardly. Thus, it is restricted that the engagement of the engaging portion 28 (the engaging member 25) and the engaged member 21 with each other is blocked by the garnish 19.

According to the aforementioned embodiment, the movable panel 12 is configured to perform the tilt-up movement in which the rear portion of the movable panel 12 moves upwardly relative to the front portion of the movable panel 12 in the vehicle front/rear direction, and the engaging member 25 and the engaged member 21 are out of contact with each other when the movable panel 12 is in the tilt-up state.

According to the aforementioned embodiment, the engaging member 25 and the engaged member 21 are out of contact with each other when the movable panel 12 is in the tilt-up state, thus the sunshade panel 17 is restricted from moving in response to the tilt-up movement of the movable panel 12 in a more appropriate manner. That is, when the movable panel 12 is in the tilt-up state, the light transmission may be adjusted by a user by adjusting the sunshade panel 17, but not by the movement of the sunshade panel 17 which is caused in response to the tilt-up movement of the movable panel 12.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A roof apparatus for a vehicle, comprising:
a movable panel configured to open and close an opening portion provided at a roof portion of a vehicle;
a sunshade configured to adjust light transmission at the opening portion and configured to be opened in association with an opening operation of the movable panel;
a guide rail provided at an edge portion of the opening portion in a vehicle width direction and extending in a vehicle front/rear direction;
a sliding member connected to an edge portion of the movable panel in the vehicle width direction and being movable along the guide rail in the vehicle front/rear direction, the sliding member causing the movable panel in a fully-closed state to move to a tilt state and causing the movable panel to perform the opening operation, by moving in the vehicle front/rear direction;
an engaging member mounted on a front portion of the movable panel in the vehicle front/rear direction, and including an engaging portion and a mounting portion at which the engaging member is mounted on the movable panel, the engaging portion being arranged at a vehicle front side relative to the mounting portion and extending downwardly; and
an engaged member provided at the sunshade to be arranged at a vehicle rear side relative to the engaging portion of the engaging member and extending upwardly from the sunshade, the engaged member being pressed by the engaging portion when the movable panel performs the opening operation; wherein
the mounting portion of the engaging member includes a mounting hole;
the engaging portion is arranged at a inner side in the vehicle width direction relative to a fastener inserted through the mounting hole; and
the engaging member includes a shielding portion covering the fastener from an inside of a vehicle cabin.

2. The roof apparatus according to claim 1, further comprising:
a front housing connected to a front end portion of the guide rail in the vehicle front/rear direction and extending in the vehicle width direction, wherein
the engaging portion of the engaging member is arranged at an inner side in the vehicle width direction relative to the guide rail, and
the engaging member is configured in a manner that mounting of the engaging member relative to the movable panel is adjustable in the vehicle front/rear direction.

3. The roof apparatus according to claim 1, further comprising:
a front housing connected to a front end portion of the guide rail in the vehicle front/rear direction and extending in the vehicle width direction, wherein
the engaging portion of the engaging member is arranged at an inner side in the vehicle width direction relative to the guide rail,
the mounting hole has an elongated circular shape and includes an allowance for adjustment in the vehicle front/rear direction, and
the engaging member is fastened to the front portion of the movable panel in the vehicle front/rear direction by means of the fastener inserted through the mounting hole.

4. The roof apparatus according to claim 1, wherein a width of the engaged member is wider than a width of the engaging portion of the engaging member in the vehicle width direction.

5. The roof apparatus according to claim 1, further comprising:
a garnish covering the sliding member from an inside of a vehicle cabin, wherein the engaging member spans over the garnish in the vehicle width direction and the engaging portion of the engaging member extends downwardly.

6. The roof apparatus according to claim 1, wherein
the movable panel is configured to perform a tilt-up movement in which a rear portion of the movable panel moves upwardly relative to a front portion of the movable panel in the vehicle front/rear direction, and
the engaging member and the engaged member are out of contact with each other when the movable panel is in a tilt-up state.

* * * * *